(12) United States Patent
Shen

(10) Patent No.: US 12,418,864 B2
(45) Date of Patent: Sep. 16, 2025

(54) METHOD FOR REDUCING SPURIOUS-EMISSION INTERFERENCE, AND COMMUNICATION DEVICE AND READABLE STORAGE MEDIUM

(71) Applicant: ZTE CORPORATION, Guangdong (CN)

(72) Inventor: Shaowu Shen, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 598 days.

(21) Appl. No.: 17/789,532

(22) PCT Filed: Dec. 30, 2020

(86) PCT No.: PCT/CN2020/141630
§ 371 (c)(1),
(2) Date: Jun. 28, 2022

(87) PCT Pub. No.: WO2021/136428
PCT Pub. Date: Jul. 8, 2021

(65) Prior Publication Data
US 2023/0046985 A1   Feb. 16, 2023

(30) Foreign Application Priority Data

Dec. 30, 2019 (CN) .................. 201911395768.2

(51) Int. Cl.
*H04W 52/24* (2009.01)
*H04B 17/336* (2015.01)
(Continued)

(52) U.S. Cl.
CPC ........ *H04W 52/243* (2013.01); *H04B 17/336* (2015.01); *H04B 17/345* (2015.01);
(Continued)

(58) Field of Classification Search
CPC ..... H04W 52/36; H04W 52/16; H04W 52/42; H04W 72/542; H04W 12/088;
(Continued)

(56) References Cited

U.S. PATENT DOCUMENTS

| 2015/0049651 | A1 | 2/2015 | Hariharan et al. |
| 2017/0317907 | A1 | 11/2017 | Chinbe et al. |
| 2019/0140340 | A1* | 5/2019 | Ramasamy .......... H01Q 1/2291 |

FOREIGN PATENT DOCUMENTS

JP    H1188210 A    3/1999

OTHER PUBLICATIONS

European Extended Search Report dated Dec. 14, 2023 in corresponding European Application No. 20910089.0, 10 pages.

\* cited by examiner

*Primary Examiner* — Tu X Nguyen
(74) *Attorney, Agent, or Firm* — MH2 TECHNOLOGY LAW GROUP LLP

(57) ABSTRACT

The present disclosure provides a method for reducing a spurious-emission interference, comprising: determining a target link in wireless communication mode, a value of a spurious-emission effect evaluation parameter of the target link in wireless communication mode exceeding a preset range; detecting whether the spurious-emission effect evaluation parameter is an impact factor for a throughput performance evaluation parameter of the target link in wireless communication mode; determining at least one cause factor causing the value of the spurious-emission effect evaluation parameter to exceed the preset range; and controlling a preset spurious-emission regulation module matching the cause factor to regulate the cause factor, so that the value of the spurious-emission effect evaluation parameter is within the preset range.

8 Claims, 5 Drawing Sheets

(51) Int. Cl.
  *H04B 17/345*  (2015.01)
  *H04B 17/354*  (2015.01)
  *H04W 52/36*  (2009.01)

(52) U.S. Cl.
  CPC ........ *H04B 17/354* (2015.01); *H04W 52/241* (2013.01); *H04W 52/367* (2013.01)

(58) Field of Classification Search
  CPC ..... H04W 88/02; H04W 52/00; H04W 52/02; H04W 88/06; H04W 52/10; H04B 17/345; H04B 7/0413
  See application file for complete search history.

METHOD FOR REDUCING SPURIOUS-EMISSION INTERFERENCE, AND COMMUNICATION DEVICE AND READABLE STORAGE MEDIUM

CROSS-REFERENCE TO RELATED APPLICATIONS

This application is based upon and claims the priority of Chinese patent application No. 201911395768.2, filed on Dec. 30, 2019 and entitled "Method for reducing a spurious-emission interference, and communication device and readable storage medium", which is incorporated herein by reference in its entirety.

FIELD OF THE INVENTION

The present disclosure relates to the technical field of communications, and in particular to a method for reducing a spurious-emission interference, a communication device and a readable storage medium.

BACKGROUND OF THE INVENTION

With the development and evolution of communication terminals, there is a growing number of links in wireless communication mode and communication bands being used, causing increasingly complicated spurious-emission problems of the communication terminals. For example, an external interference signal falling into a link in wireless communication mode that is operating may cause a spurious-emission interference, different links in wireless communication mode in the same communication terminal operating simultaneously may also cause a spurious-emission interference, and two communication terminals that are relatively closer to each other operating simultaneously may also cause a spurious-emission interference. The spurious-emission interference may cause reception sensitivity degradation or blocking of the link in wireless communication mode, and thus affect the throughput of the communication terminal.

SUMMARY OF THE INVENTION

In order to at least solve one of the mentioned problems in the existing technique, the present disclosure provides a method for reducing a spurious-emission interference, a communication device and a readable storage medium.

In a first aspect, embodiments of the disclosure provide a method for reducing a spurious-emission interference, the method including: determining a target link in wireless communication mode, a value of a spurious-emission effect evaluation parameter of the target link in wireless communication mode exceeding a preset range; detecting whether the spurious-emission effect evaluation parameter is an impact factor for a throughput performance evaluation parameter of the target link in wireless communication mode; determining, when it is detected that the spurious-emission effect evaluation parameter is an impact factor for the throughput performance evaluation parameter, at least one cause factor causing the value of the spurious-emission effect evaluation parameter to exceed the preset range; and controlling a preset spurious-emission regulation module matching the cause factor to regulate the cause factor, so that the value of the spurious-emission effect evaluation parameter is within the preset range.

In a second aspect, embodiments of the disclosure also provide a readable storage medium having a program stored thereon, which, when executed, causes the steps of the method as provided in the first aspect to be implemented.

In a third aspect, embodiments of the disclosure also provide a communication device, the device including: one or more processors; and a memory, which stores one or more programs, where the one or more programs, when executed by the one or more processors, cause the steps of the method for reducing a spurious-emission interference as provided in the first aspect to be implemented.

DETAILED DESCRIPTION OF THE EMBODIMENTS

In order to enable those skilled in the art to better understand the technical solutions of the disclosure, a method for reducing a spurious-emission interference, a communication device and a readable storage medium provided by the disclosure will be described below in detail in conjunction with the accompanying drawings.

The exemplary embodiments will be described below more fully with reference to the accompanying drawings, but the exemplary embodiments can be embodied in different forms and should not be construed as being limited to the embodiment set forth herein. Otherwise, these embodiments are provided so that the disclosure is thorough and complete, and those skilled in the art are enabled to fully understand the scope of the disclosure.

The terms used herein are merely to describe the particular embodiments rather than limiting the disclosure. The singular forms "a" and "the", as used herein, are also intended to include the plural forms, unless the context clearly indicates otherwise. It should also be understood that when the term "including" and/or "composed of" is used in this description, it indicates the presence of features, entities, steps and/or operations, but does not exclude the presence or addition of one or more other features, entities, steps and/or operations.

Unless otherwise defined, all terms used herein (including technical and scientific terms) have the same meanings as commonly understood by those of ordinary skill in the art. It should also be understood that terms such as those defined in a common dictionary should be interpreted as having the meaning consistent with the meaning thereof in the background of the related art and the disclosure, and not be interpreted as having an idealized or excessively formal meaning, unless explicitly defined as herein.

In the disclosure, the communication terminal refers to a device having a communication function, such as a mobile phone, a tablet and a notebook. In the description below, exemplary description is made by taking the communication terminal being a 5G mobile phone as an example. In the 5G mobile phone, a link in wireless communication mode contained therein generally includes a 2G link, a 3G link, a 4G link, a 5G link, a Wi-Fi link, a Bluetooth link, a millimeter wave link, etc.

In the disclosure, the communication terminal in a dual-connectivity or multi-connectivity operation state refers to a communication terminal in which at least two links in wireless communication mode operate simultaneously. For example, the 4G link and the 5G link operate simultaneously to form the dual-connectivity operation state, and the 4G link, the 5G link and the Wi-Fi link operate simultaneously to form the multi-connectivity operation state.

Figure 1:
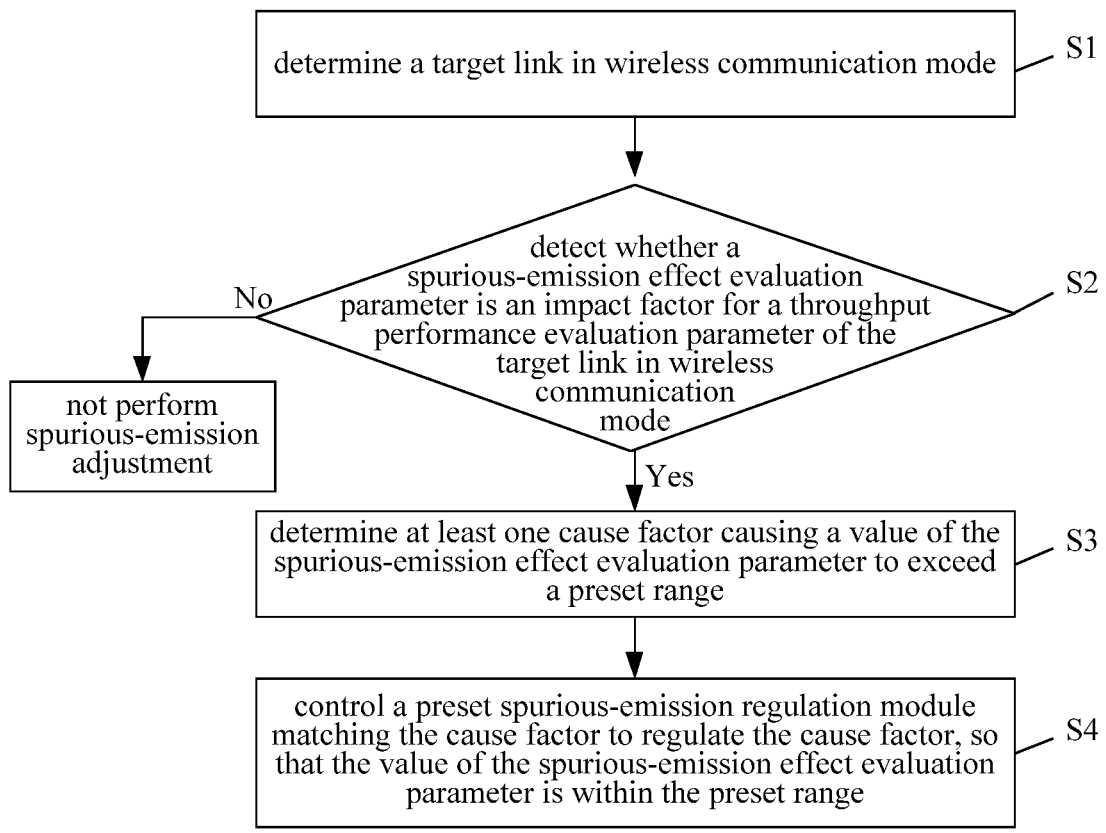
FIG. 1 is a flowchart of a method for reducing a spurious-emission interference as provided in an embodiment of the disclosure.

FIG. 1 is a flowchart of a method for reducing a spurious-emission interference as provided in an embodiment of the disclosure. As shown in FIG. 1, the method for reducing a spurious-emission interference includes the following steps.

At step S1, a target link in wireless communication mode is determined.

In step S1, links in wireless communication mode within a terminal being in a currently operating state, and corresponding information such as that of an operation channel, a channel, etc. can be checked via a radio frequency chip and a baseband chip. A spurious-emission effect evaluation parameter of the link in wireless communication mode that is currently operating in the communication terminal is then detected, and a link in wireless communication mode, a spurious-emission effect evaluation parameter of which exceeds a preset range, is determined as the target link in wireless communication mode.

The spurious-emission effect evaluation parameter is used for representing the degree of effect of a spurious-emission interference on the link in wireless communication mode. In some embodiments, the spurious-emission effect evaluation parameter includes an adjacent channel leakage ratio (ACLR), a received signal level, a received signal strength indication (RSSI) and a signal noise ratio (SNR).

A value of the ACLR is a negative value, and a greater absolute value of the ACLR indicates that the degree of effect of the spurious-emission interference on the link in wireless communication mode is higher. A smaller value of the received signal level indicates that the degree of effect of the spurious-emission interference on the link in wireless communication mode is higher. A smaller value of the received signal strength indication indicates that the degree of effect of the spurious-emission interference on the link in wireless communication mode is higher. A smaller value of the signal noise ratio indicates that the degree of effect of the spurious-emission interference on the link in wireless communication mode is higher.

For different spurious-emission effect evaluation parameters, a preset range corresponding to each of the spurious-emission effect evaluation parameters can be pre-configured by experiment. When the spurious-emission effect evaluation parameter is within the corresponding preset range, it indicates that a spurious-emission interference does not exceed a standard; or when the spurious-emission effect evaluation parameter is outside the corresponding preset range, it indicates that the spurious-emission interference exceeds the standard.

It should be noted that, in the embodiments of the disclosure, there may be one or more selected spurious-emission effect evaluation parameters. When there are a plurality of selected spurious-emission effect evaluation parameters, if a value of at least one spurious-emission effect evaluation parameter of a link in wireless communication mode is outside a corresponding preset range, it indicates that a spurious-emission effect on the target link in wireless communication mode exceeds the standard, and the link in wireless communication mode is determined as the target link in wireless communication mode; or if values of all the spurious-emission effect evaluation parameters of the link in wireless communication mode are within respective corresponding preset ranges, it indicates that the spurious-emission effect on the target link in wireless communication mode meets the standard, and the link in wireless communication mode is not taken as the target link in wireless communication mode.

At step S2, whether the spurious-emission effect evaluation parameter is an impact factor for the throughput performance evaluation parameter of the target link in wireless communication mode is detected.

The throughput performance evaluation parameter is used for representing the throughout performance of the link in wireless communication mode. In some embodiments, the throughput performance evaluation parameter includes an uplink/downlink bit error rate, an uplink/downlink data transmission rate, etc. A higher bit error rate indicates a poorer throughput performance; and a lower data transmission rate indicates a poorer throughput performance In step S2, detecting whether the spurious-emission effect evaluation parameter is an impact factor for the throughput performance evaluation parameter of the target link in wireless communication mode is to detect whether the throughput performance of the target link in wireless communication mode is associated with a spurious-emission interference thereon.

In general, if the higher the degree of effect of the spurious-emission interference on the link in wireless communication mode is, the poorer the throughput performance is, it indicates that the throughput performance is associated with the spurious-emission interference, and then the spurious-emission effect evaluation parameter is one of the impact factors for the throughput performance evaluation parameters.

When it is detected that the spurious-emission effect evaluation parameter is the impact factor for the throughput performance evaluation parameter of the target link in wireless communication mode, the process proceeds to step S3; otherwise, spurious-emission adjustment is not performed.

At step S3, at least one cause factor causing the value of the spurious-emission effect evaluation parameter to exceed the preset range is determined.

In step S3, the cause factor causing the value of the spurious-emission effect evaluation parameter of the target link in wireless communication mode to exceed the preset range is analyzed and extracted.

At step S4, a preset spurious-emission regulation module matching the cause factor is controlled to regulate the cause factor, so that the value of the spurious-emission effect evaluation parameter is within the preset range.

In the embodiments of the disclosure, corresponding preset spurious-emission regulation modules have been pre-configured for different types of cause factors. In step S4, the preset spurious-emission regulation module matching the cause factor that is determined in step S3 is controlled to regulate the cause factor causing the value of the spurious-emission effect evaluation parameter to exceed the preset range, so that the value of the spurious-emission effect evaluation parameter is within the preset range.

It should be noted that the overall throughput performance of the communication terminal without degradation should also be ensured during controlling the preset spurious-emission regulation module to regulate the cause factor.

In the solutions provided in the embodiments of the disclosure, a spurious-emission effect evaluation parameter and a throughput performance evaluation parameter of a target link in wireless communication mode are detected, such that whether the throughput performance of the target link in wireless communication mode is associated with a spurious-emission interference thereon can be detected; and when the throughput performance is associated with the spurious-emission interference, a cause factor causing the value of the spurious-emission effect evaluation parameter to exceed a standard is determined, and a corresponding preset spurious-emission regulation module is controlled to regulate the cause factor, so as to reduce the degree of effect of the spurious-emission interference on the link in wireless communication mode, thereby realizing dynamically adaptive anti-interference regulation, which is conducive to improving the throughput performance of a communication terminal.

Figure 2:
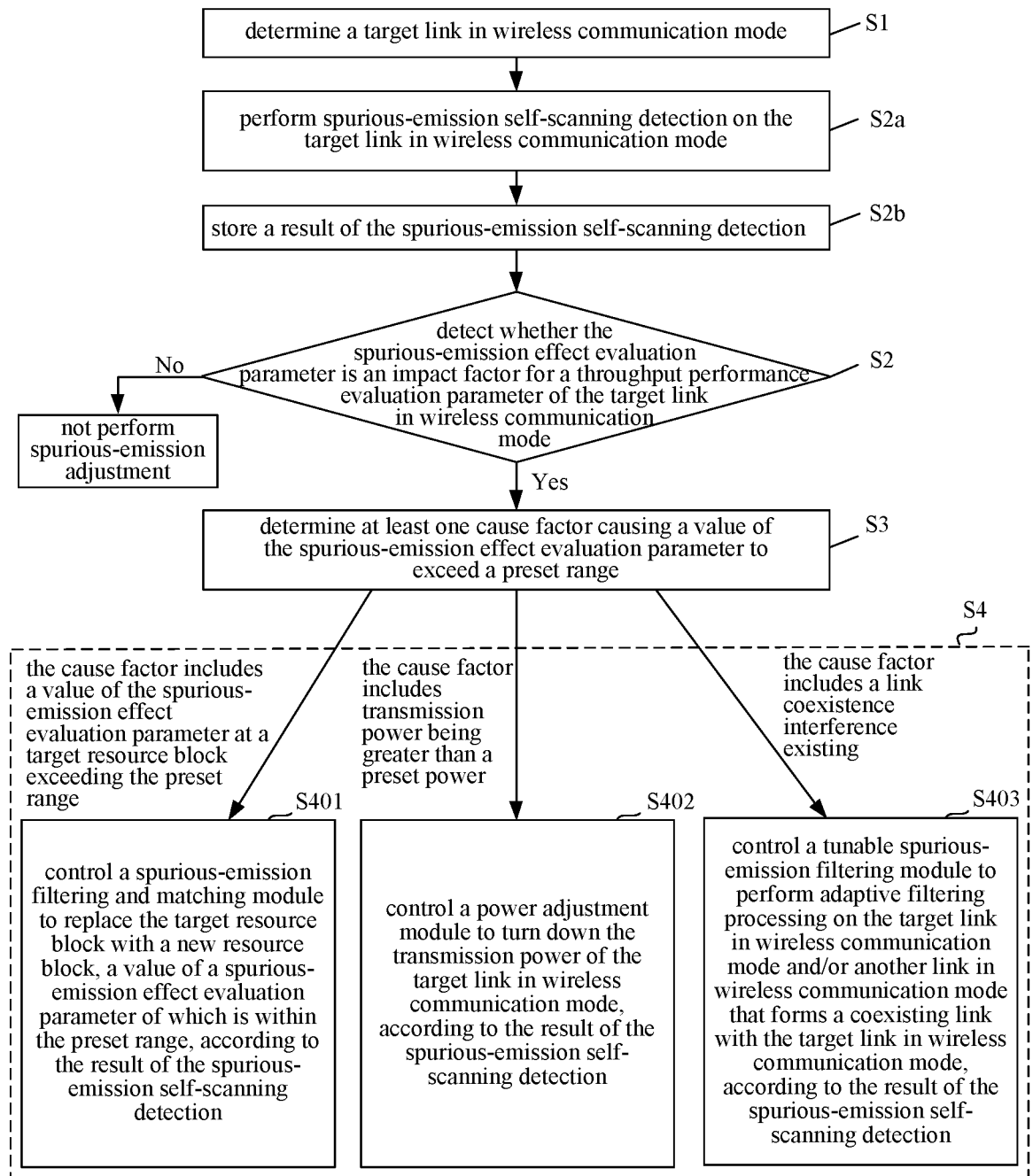
FIG. 2 is a flowchart of another method for reducing a spurious-emission interference as provided in an embodiment of the disclosure.

FIG. 2 is a flowchart of another method for reducing a spurious-emission interference as provided in an embodiment of the disclosure. As shown in FIG. 2, the method for reducing a spurious-emission interference includes the following steps.

At step S1, a target link in wireless communication mode is determined.

At step S2a, spurious-emission self-scanning detection is performed on the target link in wireless communication mode.

Figure 3:
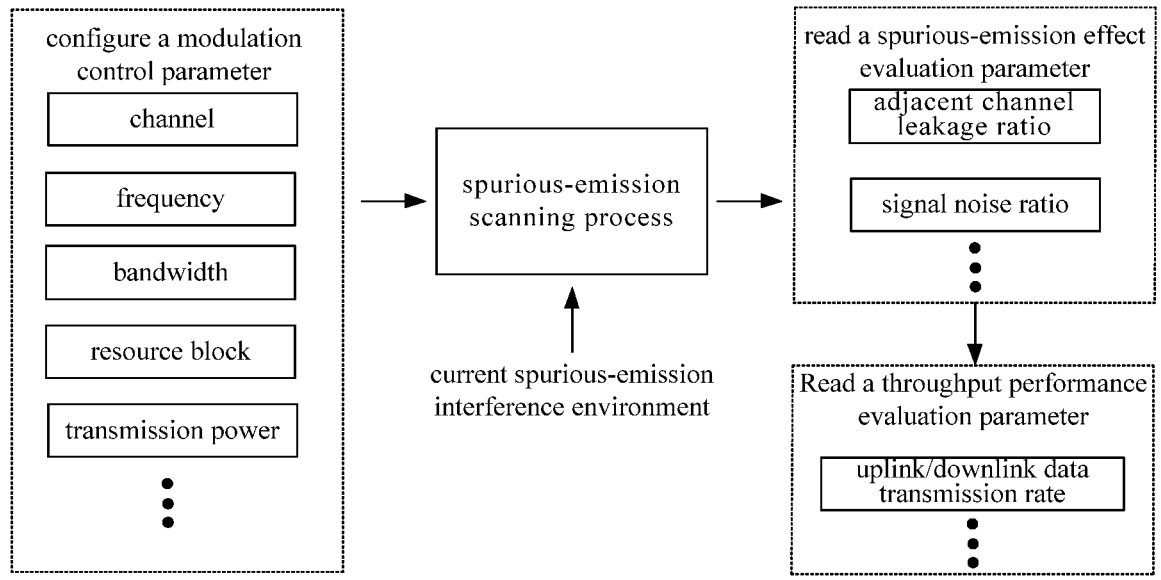
FIG. 3 is a schematic diagram of the principle of performing spurious-emission self-scanning in an embodiment of the disclosure.

FIG. 3 is a schematic diagram of the principle of performing spurious-emission self-scanning in an embodiment of the disclosure. As shown in FIG. 3, in step S2, in a spurious-emission interference environment in which the communication terminal is currently located, spurious-emission self-scanning detection may be performed on the target link in wireless communication mode on the basis of a preset spurious-emission scanning process, so as to obtain the value of the spurious-emission effect evaluation parameter and the value of the throughput performance evaluation parameter, respectively corresponding to the target link in wireless communication mode when a modulation control parameter has different values.

In some embodiments, the modulation control parameter includes at least one of a transmission power, an operating band, a bandwidth, a resource block (RB), an operating frequency and a link coexistence interference.

The spurious-emission effect evaluation parameter being an ACLR and the communication terminal being a mobile phone are taken as an example. A value of an ACLR and a value of a throughput performance evaluation parameter of a target link in wireless communication mode under different values of the modulation control parameter are detected on the basis of a self-transmitted and self-received ACLR detection algorithm of the mobile phone. By using the self-transmitted and self-received ACLR detection algorithm, permanent control and closed-loop detection can be performed via a radio frequency chip on the target link in wireless communication mode when the link operates under conditions of different modulation control parameters, such as different transmission powers, different bands, different frequencies, different bandwidths, different resource blocks, etc., and values of the ACLR and the throughput performance evaluation parameter corresponding to the target link in wireless communication mode under different modulation control parameter can be collected via the radio frequency chip, without any additional meter.

In some embodiments, it is also possible to generate, on the basis of values of the spurious-emission effect evaluation parameter corresponding to the target link in wireless communication mode during spurious-emission self-scanning detection under different modulation control parameters, a profile of values of the spurious-emission effect evaluation parameter or of values of the throughput performance evaluation parameter as a function of values of the modulation control parameter for each of the modulation control parameters. For example, when the spurious-emission effect evaluation parameter is a value of an ACLR, and the modulation control parameter is a transmission power, it is possible to generate, on the basis of a result of the spurious-emission self-scanning detection, a profile of values of the ACLR as a function of transmission power.

At step S2b, a result of the spurious-emission self-scanning detection is stored.

In step S2b, the result of the spurious-emission self-scanning detection obtained in step S2a is stored for subsequent reference and calling.

At step S2, whether the spurious-emission effect evaluation parameter is an impact factor for the throughput performance evaluation parameter of the target link in wireless communication mode is detected.

In step S2, whether the spurious-emission effect evaluation parameter is an impact factor for the throughput performance evaluation parameter is detected according to the result of the spurious-emission self-scanning detection. For example, in the result of the spurious-emission self-scanning detection, if the transmission power decreases but the value of the ACLR increases and the throughput performance is improved, it indicates that the throughput performance of the target link in wireless communication mode is associated with the value of the ACLR (i.e., indicating that the throughput performance is related to spurious-emission). For example, in the case that the terminal operates in the dual-connectivity or multi-connectivity state, if the value of the ACLR of the target link in wireless communication mode increases and the throughput performance thereof is improved when other links in wireless communication mode are turned off or the transmission power of other links in wireless communication mode is turned down, it indicates that the throughput performance of the target link in wireless communication mode is associated with the value of the ACLR.

If the result of the spurious-emission self-scanning detection presents a rule in which the higher the degree of effect of the spurious-emission interference on the link in wireless communication mode is, the poorer the throughput performance is, it can be determined that the throughput performance is associated with the spurious-emission interference, that is, it is detected that the spurious-emission effect evaluation parameter is the impact factor for the throughput performance evaluation parameter of the target link in wireless communication mode. It should be noted that a detection algorithm is not particularly limited by the solutions of the disclosure.

At step S3, at least one cause factor causing the value of the spurious-emission effect evaluation parameter to exceed the preset range is determined.

In the embodiments of the disclosure, on the basis of the result of the spurious-emission self-scanning detection that is obtained in step S2a, the result can be used for detecting whether the throughput performance of the target link in wireless communication mode is associated with the spurious-emission interference thereon, and can also be used for determining a cause factor causing current spurious-emission of the target link in wireless communication mode to exceed a standard.

At step S3, a cause factor causing the value of the spurious-emission effect evaluation parameter to exceed the preset range is determined.

As an example, if the result of the spurious-emission self-scanning detection presents that a value of a spurious-emission effect evaluation parameter of the target link in wireless communication mode, at certain one or more resource blocks and within a band at which the link is currently operating, exceeds the preset range, then it can be determined that one of the cause factors causing the spurious-emission of the target link in wireless communication mode to exceed the standard may be the spurious-emission interference on the one or more resource blocks above being too large (i.e., a value of the spurious-emission effect evaluation parameter at a target resource block exceeding the preset range).

As another example, in the result of the spurious-emission self-scanning detection, if the transmission power decreases but the value of the ACLR increases and the throughput performance is improved, it is possible to indicate that the throughput performance is related to the spurious-emission, and it is also possible to determine that one of the cause factors causing the spurious-emission of the target link in wireless communication mode to exceed the standard may be the transmission power being too large (i.e., the transmission power being greater than a preset power).

As still another example, in the case that the communication terminal operates in the dual-connectivity or multi-connectivity state, in the result of the spurious-emission self-scanning detection, if the value of the ACLR of the target link in wireless communication mode increases and the throughput performance thereof is improved when other links in wireless communication mode are turned off or the transmission power of other links in wireless communication mode is turned down, and the value of the ACLR of other links in wireless communication mode increases and the throughput performance thereof is improved when the target link in wireless communication mode is turned off or the transmission power of the target link in wireless communication mode is turned down, it indicates that one of the cause factors causing the spurious-emission of the target link in wireless communication mode to exceed the standard may be a link coexistence interference caused by the target link in wireless communication mode and other links in wireless communication mode.

At step S4, a preset spurious-emission regulation module matching the cause factor is controlled to regulate the cause factor, so that the value of the spurious-emission effect evaluation parameter is within the preset range.

During performing the spurious-emission self-scanning detection in step S2a, the modulation control parameter includes a resource block; and when it is determined that the cause factor causing the value of the spurious-emission effect evaluation parameter to exceed the preset range comprises a value of a spurious-emission effect evaluation parameter at a target resource block exceeding the preset range, the preset spurious-emission regulation module may include a spurious-emission filtering and matching module. In this case, step S4 includes step S401.

At S401, the spurious-emission filtering and matching module is controlled to replace, according the result of the spurious-emission self-scanning detection, the target resource block with a new resource block, a value of a spurious-emission effect evaluation parameter of which is within the preset range.

Figure 4:
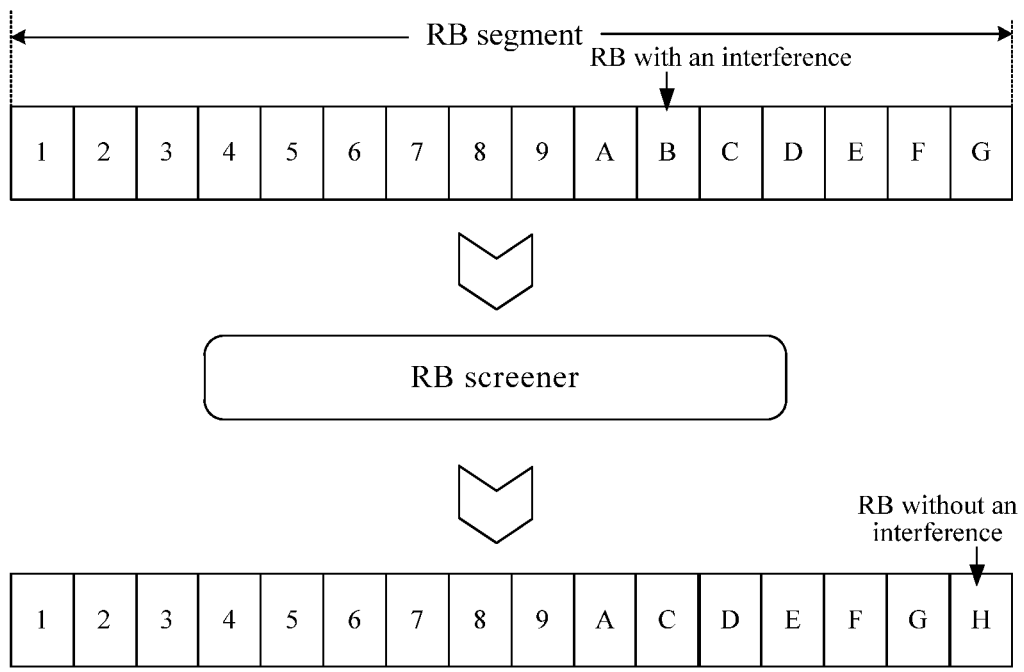
FIG. 4 is a schematic diagram of the principle of performing resource block replacement in an embodiment of the disclosure.

FIG. 4 is a schematic diagram of the principle of performing resource block replacement in an embodiment of the disclosure. As shown in FIG. 4, the spurious-emission filtering and matching module includes an RB screener (i.e., a frequency filter) and an adaptive switching control program. After the positions and the number of target resource blocks are determined through step S4, a filtering parameter of the RB screener is set by the adaptive switching control program, so as to filter out an RB having a great spurious-emission interference, and then add an RB or a slice segment having no spurious-emission interference or having a small spurious-emission interference at the position where the RB is filtered out or the position of a slice segment where the RB is located.

With reference to FIG. 4, if a communication protocol packet of the target link in wireless communication mode requires 160 RBs, and the total number of RBs is 273, every ten of the original 160 RBs are made into one slice, so as to obtain 16 groups of RBs in total, which are defined as 1-9 and A-G, respectively. If it is detected that a spurious-emission interference on a segment B exceeds the standard, it is possible to filter out the segment B via the frequency filter, and also add a segment H, which includes RBs without interference.

During performing the spurious-emission self-scanning detection in step S2a, the modulation control parameter includes a transmission power; and when it is determined that the cause factor causing the value of the spurious-emission effect evaluation parameter to exceed the preset range comprises the transmission power being greater than a preset power, the preset spurious-emission regulation module may include a power adjustment module. In this case, step S4 includes step S402.

At step 402, the power adjustment module is controlled to turn down, according to the result of the spurious-emission self-scanning detection, the transmission power of the target link in wireless communication mode.

The power adjustment module is controlled to store a power control program, which has the function of adjusting a transmission power of a link in wireless communication mode.

Figure 5:
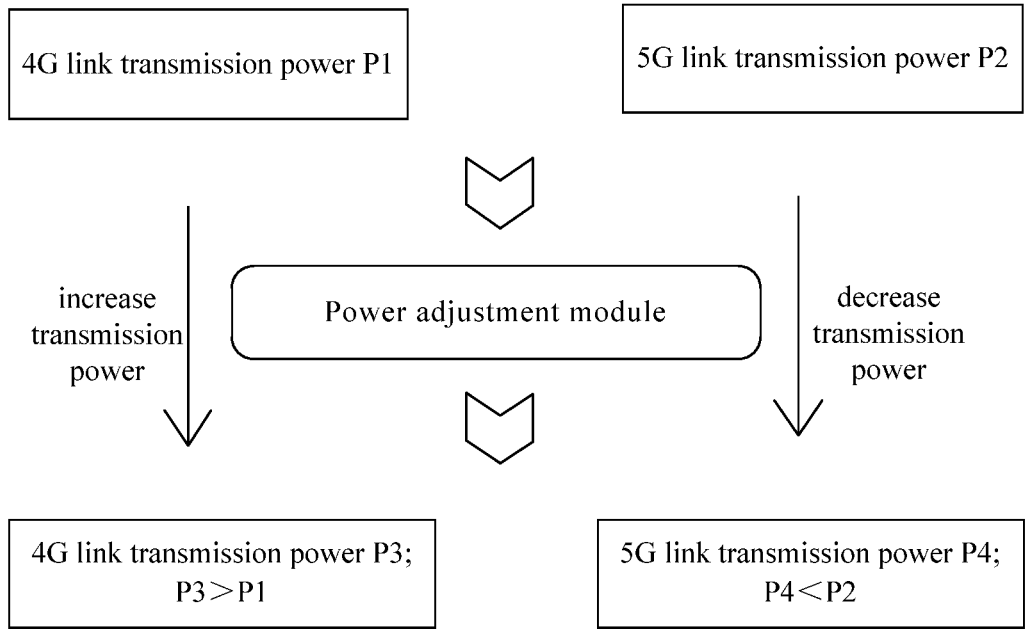
FIG. 5 is a schematic diagram of the principle of performing transmission power adjustment in an embodiment of the disclosure.

FIG. 5 is a schematic diagram of the principle of performing transmission power adjustment in an embodiment of the disclosure. As shown in FIG. 5, the situation where the 4G link and the 5G link in the communication device operate simultaneously and the communication device operates in the dual-connectivity state is taken as an example. If it is determined, through step S1, that a spurious-emission interference on the 5G link exceeds the standard (the 5G link being the target link in wireless communication mode) and a spurious-emission interference on the 4G link does not exceed the standard, and it is determined, through step S3, that one of the cause factor for the spurious-emission interference on the 5G link exceeding the standard is the transmission power of the 5G link being too high, then it is possible to appropriately turn down the transmission power of the 5G link and turn up the transmission power of the 4G link on the basis of a preset dynamic power sharing control algorithm.

For example, if the current maximum transmission power of the 5G link is 23 DB, and the current maximum transmission power of the 4G link is 5 DB, where the spurious-emission interference on the 5G link greatly exceeds the standard and the spurious-emission interference on the 4G link is relatively weak, then it is possible to adjust the maximum transmission powers of the 5G link and the 4G link on the basis of the preset dynamic power sharing control algorithm and the result of the spurious-emission self-scanning detection. When the result of the spurious-emission interference on the 5G link that is obtained in step S2a presents that the maximum transmission power of the 5G link is 20 DB and the maximum transmission power of the 4G link does not exceed 8 G, and the value of the spurious-emission effect evaluation parameter of the 5G link is within the preset range, then it is possible to decrease the maximum transmission power of the 5G link to 20 DB and increase the maximum power of the 4G link to 8 DB. The purpose of turning down the maximum transmission power of the 5G link as mentioned above is to reduce the spurious-emission interference on the 5G link, while the purpose of turning up the maximum transmission power of the 4G link is to improve the overall throughput performance of the communication device.

During performing the spurious-emission self-scanning detection in step S2a, the modulation control parameter includes a link coexistence interference; and when it is determined that the cause factor causing the value of the spurious-emission effect evaluation parameter to exceed preset range comprises a link coexistence interference existing, the preset spurious-emission regulation module may include a tunable spurious-emission filtering module. In this case, step S4 includes step S403.

At step 403, the tunable spurious-emission filtering module is controlled to perform, according the result of spurious-emission self-scanning detection, adaptive filtering processing on the target link in wireless communication mode and/or another link in wireless communication mode that forms a coexisting link with the target link in wireless communication mode.

Figure 6:
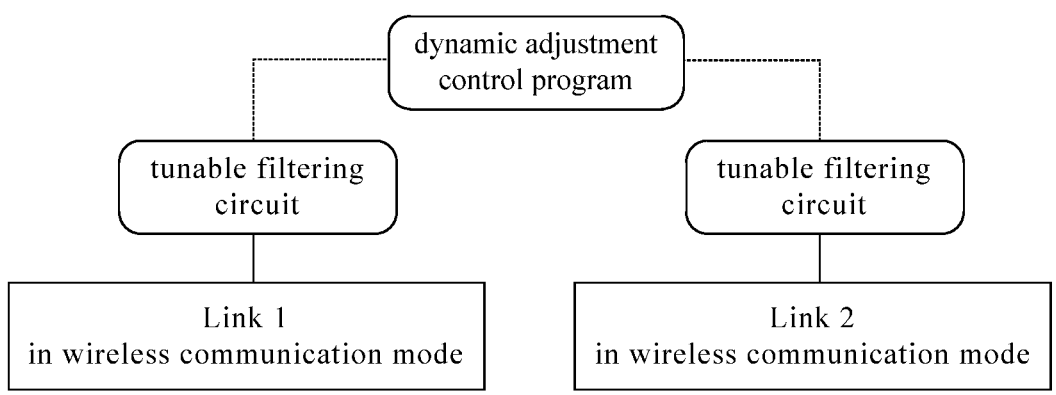
FIG. 6 is a schematic diagram of the principle of performing tunable spurious-emission filtering in an embodiment of the disclosure.

FIG. 6 is a schematic diagram of the principle of performing tunable spurious-emission filtering in an embodiment of the disclosure. As shown in FIG. 6, the tunable spurious-emission filtering module is composed of a tunable filtering circuit. In practical application, each link in wireless communication mode can be configured with one corresponding tunable filtering circuit. Such a tunable means may be a micro-electro-mechanical system (MEMS) resistance-capacitance-inductance tunable means, and may also be other tunable means. The tunable filtering circuit is placed on a transmission link of the corresponding link in wireless communication mode, for example, in front of a radio-frequency switch or behind a radio-frequency power amplifier.

When it is detected that the target link in wireless communication mode is subjected to a link coexistence interference (a spurious-emission interference caused by different bands of links affecting each other) since the communication terminal in the dual-connectivity or the multi-connectivity state, a filtering parameter of a tunable filtering circuit corresponding to a side of the target link in wireless communication mode and/or a side of the another link in wireless communication mode that forms a coexisting link with the target link in wireless communication mode is changed on the basis of a dynamic adjustment control program, so that dynamic suppression is formed between the target link in wireless communication mode and the another link in wireless connection mode that forms the coexisting link. A matching value of the side of the target link in wireless communication mode and the side of the another link in wireless communication mode is adaptively adjusted according to a mapping relationship between the value of the spurious-emission effect evaluation parameter and the value of the throughput performance evaluation parameter or the SNR in a link coexistence mode in the result of the spurious-emission self-scanning detection that is obtained in step S2a, so as to form a corresponding band filter, thereby achieving effect of filtering out a spurious-emission interference. A regulation process is a conventional technique in this field, and will not be described here in detail.

It should be noted that, in some embodiments, there are a plurality of cause factors causing the value of the spurious-emission effect evaluation parameter to exceed the preset range, and then it is necessary to control a plurality of preset spurious-emission regulation modules respectively matching the plurality of cause factors to regulate the corresponding cause factors, that is, the spurious-emission interference is reduced by the joint regulation via the plurality of preset spurious-emission regulation modules.

Figure 7:
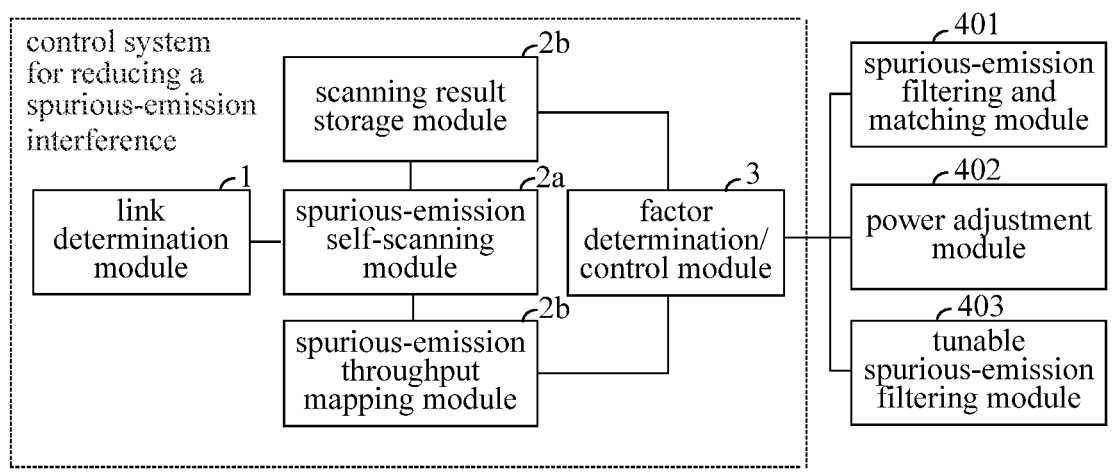
FIG. 7 is a block diagram of a functional structure of a communication device provided in an embodiment of the disclosure.

FIG. 7 is a block diagram of a functional structure of a communication device provided in an embodiment of the disclosure. As shown in FIG. 7, the communication device includes one or more processors and a memory. The memory stores one or more programs. When the one or more programs are executed by the one or more processors, the one or more processors are enabled to implement the steps of the method for reducing a spurious-emission interference as provided in the foregoing embodiments.

In the embodiment, when the processor runs the program in the memory, the processor can be equivalent to a virtual system for reducing a spurious-emission interference, and the system for reducing a spurious-emission interference includes the following virtual function modules: a link determination module 1, a spurious-emission self-scanning module 2a, a scanning result storage module 2b, a spurious-emission throughput mapping module 2, and a factor determination and control module 3.

The link determination module 1 is configured to determine a target link in wireless communication mode, i.e., being capable of implementing step S1 in the foregoing embodiments.

The spurious-emission self-scanning module 2a is configured to perform spurious-emission self-scanning detection on the target link in wireless communication mode, i.e., being capable of implementing step S2a in the foregoing embodiments.

The scanning result storage module 2b is configured to store a result of the spurious-emission self-scanning detection, i.e., being capable of implementing step S2b in the foregoing embodiments.

The spurious-emission throughput mapping module 2 is configured to detect whether the spurious-emission effect evaluation parameter is an impact factor for the throughput performance evaluation parameter of the target link in wireless communication mode, i.e., being capable of implementing step S2 in the foregoing embodiments.

The factor determination and control module 3 is configured to determine at least one cause factor causing the value of the spurious-emission effect evaluation parameter to exceed the preset range, and to control a preset spurious-emission regulation module matching the cause factor to regulate the cause factor, so that the value of the spurious-emission effect evaluation parameter is within the preset range, i.e., being capable of implementing steps S3 and S4 in the foregoing embodiments.

In addition to the above-mentioned function modules, the communication device is further previously provided with preset spurious-emission regulation modules configured for different cause factors.

In some embodiments, there are three preset spurious-emission regulation modules, namely, a spurious-emission filtering and matching module 401, a power adjustment module 402 and a tunable spurious-emission filtering module 403.

The spurious-emission filtering and matching module 401 is configured to replace, according to the result of the spurious-emission self-scanning detection, a target resource block with a new resource block, a value of a spurious-emission effect evaluation parameter of which is within the preset range, in response to the control by the factor determination and control module when the factor determination and control module determines that the cause factor causing the value of the spurious-emission effect evaluation parameter to exceed the preset range comprises a value of a spurious-emission effect evaluation parameter at the target resource block exceeding the preset range.

The power adjustment module 402 is configured to turn down, according to the result of the spurious-emission self-scanning detection, a transmission power of the target link in wireless communication mode in response to the control by the factor determination and control module when the factor determination and control module determines that the cause factor causing the value of the spurious-emission effect evaluation parameter to exceed the preset range comprises the transmission power being greater than the preset power.

The tunable spurious-emission filtering module 403 is configured to perform, according to the result of spurious-emission self-scanning detection, adaptive filtering processing on the target link in wireless communication mode and/or another link in wireless communication mode that forms a coexisting link with the target link in wireless communication mode when the factor determination and control module determines that the cause factor causing the value of the spurious-emission effect evaluation parameter to exceed preset range comprises a link coexistence interference existing.

For detailed description of the spurious-emission filtering and matching module 401, the power adjustment module 402 and the tunable spurious-emission filtering module 403, reference can be made to the corresponding contents in the foregoing embodiments, which will not be repeated herein.

The embodiments of the disclosure further provide a readable storage medium, which stores a program. When the program is executed, the steps of the method for reducing a spurious-emission interference as provided in the foregoing embodiments are implemented.

It can be understood by those of ordinary skill in the art that all or some of the steps in the method disclosed above, and a function module/unit in an apparatus can be embodied as software, firmware, hardware and a suitable combination thereof. In the hardware embodiment, the division of the function modules/units mentioned in the above description does not necessarily correspond to the division of physical assemblies. For example, one physical assembly can have a plurality of functions, or one function or step can be executed by several physical assemblies in cooperation. Some assemblies or all the assemblies can be embodied as software that is executed by a processor, such as a central processing unit, a digital signal processor or a microprocessor, or be embodied as hardware, or be embodied as an integrated circuit, such as an application specific integrated circuit. Such software can be distributed on a computer-readable storage medium, and the computer-readable storage medium can include a computer storage medium (or a non-transitory medium) and a communication medium (or a transitory medium). As is known to one of ordinary skill in the art, the term, computer storage medium, includes volatile and non-volatile, removable and non-removable media implemented in any method or technology for storing information such as computer-readable instructions, data structures, program modules, or other data. The computer storage medium comprises but is not limited to an RAM, an ROM, an EEPROM, a flash memory or other storage techniques, a CD-ROM, a digital versatile disc (DVD) or other optical disc memory, a cassette tape, tape or disc memory or other magnetic storage, or any other medium that can be used to store desired information and that can be accessed by a computer. In addition, it is well known to those of ordinary skill in the art that a communication medium generally contains computer-readable instructions, data structures, program modules or other data in a modulated data signal such as a carrier or other transmission mechanisms, and can include any information transfer medium.

The exemplary embodiments are disclosed herein. Although specific terms are used, they are merely used for, and should only be interpreted as a general illustrative meaning, and are not used for the purpose of limitation. In some instances, it is obvious to those skilled in the art that, unless explicitly stated otherwise, the features, the characteristics and/or the factors that are described in conjunction with the particular embodiments can be used alone, or be used in combination with the features, the characteristics and/or the elements that are described in conjunction with other embodiments. Therefore, it will be understood by those skilled in the art that various changes in form and detail may be made without departing from the scope of the disclosure set forth by the appended claims.

The invention claimed is:

1. A method for reducing a spurious-emission interference, comprising:
    determining a target link in wireless communication mode from links in wireless communication mode in a currently operating state, a value of a spurious-emission effect evaluation parameter of the target link in wireless communication mode exceeding a preset range;
    performing spurious-emission self-scanning detection on the target link in wireless communication mode, so as to obtain the value of the spurious-emission effect evaluation parameter and a value of the throughput performance evaluation parameter, respectively corresponding to the target link in wireless communication mode when a modulation control parameter has different values;
    detecting whether the spurious-emission effect evaluation parameter is an impact factor for a throughput performance evaluation parameter of the target link in wireless communication mode;
    determining, when it is detected that the spurious-emission effect evaluation parameter is an impact factor for the throughput performance evaluation parameter, at least one cause factor causing the value of the spurious-emission effect evaluation parameter to exceed the preset range; and controlling a preset spurious-emission regulation module matching the cause factor to regulate the cause factor, so that the value of the spurious-emission effect evaluation parameter is within the preset range;

wherein the step of detecting whether the spurious-emission effect evaluation parameter is an impact factor for the throughput performance evaluation parameter of the target link in wireless communication mode comprises: detecting, according to a result of the spurious-emission self-scanning detection, whether the spurious-emission effect evaluation parameter is an impact factor for the throughput performance evaluation parameter;

the modulation control parameter comprises a resource block and at least one of a transmission power, an operating band, a bandwidth, an operating frequency and a link coexistence interference;

wherein when it is determined that the cause factor causing the value of the spurious-emission effect evaluation parameter to exceed the preset range comprises a value of a spurious-emission effect evaluation parameter at a target resource block exceeding the preset range, the preset spurious-emission regulation module comprises a spurious-emission filtering and matching module; and the step of controlling the preset spurious-emission regulation module matching the cause factor to regulate the cause factor comprises: controlling the spurious-emission filtering and matching module to replace, according to the result of the spurious-emission self-scanning result, the target resource block with a new resource block, a value of a spurious-emission effect evaluation parameter of which is within the preset range.

2. The method according to claim 1, wherein the modulation control parameter further comprises at least the transmission power;

wherein when it is determined that the cause factor causing the value of the spurious-emission effect evaluation parameter to exceed the preset range comprises the transmission power being greater than a preset power, the preset spurious-emission regulation module further comprises a power adjustment module; and wherein the step of controlling the preset spurious-emission regulation module matching the cause factor to regulate the cause factor further comprises:

controlling the power adjustment module to turn down, according to the result of the spurious-emission self-scanning detection, the transmission power of the target link in wireless communication mode.

3. The method according to claim 1, wherein the modulation control parameter further comprises at least the link coexistence interference;

wherein when it is determined that the cause factor causing the value of the spurious-emission effect evaluation parameter to exceed the preset range comprises a link coexistence interference existing, the preset spurious-emission regulation module further comprises a tunable spurious-emission filtering module; and wherein the step of controlling the preset spurious-emission regulation module matching the cause factor to regulate the cause factor further comprises:

controlling the tunable spurious-emission filtering module to perform, according to the result of the spurious-emission self-scanning detection, adaptive filtering processing on the target link in wireless communication mode and/or another link in wireless communication mode that forms a coexisting link with the target link in wireless communication mode.

4. The method according to claim 1, wherein after the step of performing spurious-emission self-scanning detection on the target link in wireless communication mode, the method further comprises:

storing the result of the spurious-emission self-scanning detection.

5. The method according to claim 1, wherein the spurious-emission effect evaluation parameter comprises at least one of an adjacent channel leakage ratio, a received signal level, a received signal strength indication and a signal noise ratio.

6. A non-transitory computer-readable storage medium having a program stored thereon, which, when executed, causes the steps of the method according to claim 1 to be implemented.

7. A communication device, comprising:
one or more processors; and
a memory, which stores one or more programs,
wherein the one or more programs, when executed by the one or more processors, cause the steps of the method according to claim 1 to be implemented.

8. The communication device according to claim 7, further comprising preset spurious-emission regulation modules matching different cause factors.

* * * * *